US005118990A

United States Patent [19]

Makita

[11] Patent Number: 5,118,990

[45] Date of Patent: Jun. 2, 1992

[54] DISCHARGE LAMP SYSTEM

[75] Inventor: Hiroyuki Makita, Shimizu, Japan

[73] Assignee: Koito Manufacturing Co., Ltd., Tokyo, Japan

[21] Appl. No.: 623,627

[22] Filed: Dec. 6, 1990

[30] Foreign Application Priority Data

Dec. 12, 1989 [JP] Japan ........ 1-321676

[51] Int. Cl.[5] ........ B60Q 1/26

[52] U.S. Cl. ........ 315/77; 315/82; 315/291; 315/56; 315/62; 362/61; 362/83; 361/377

[58] Field of Search ........ 361/377; 315/77, 82, 315/DIG. 7, 56, 62, 291; 362/216, 61, 83; 307/10.8

[56] References Cited

U.S. PATENT DOCUMENTS

| | | | |
|---|---|---|---|
| 3,760,217 | 9/1973 | Martin et al. | 313/222 |
| 4,244,013 | 1/1981 | Wotowiec | 362/216 |
| 4,316,120 | 2/1982 | Cotman et al. | 362/216 |
| 4,482,842 | 11/1984 | Fujimura et al. | 313/634 |
| 4,513,357 | 4/1985 | Nieda et al. | 362/83 |
| 4,527,098 | 7/1985 | Owen | 315/DIG. 7 |
| 4,631,446 | 12/1986 | English et al. | 313/634 |
| 4,683,402 | 7/1987 | Aubrey | 315/56 |
| 4,686,421 | 8/1987 | Scholz | 315/73 |
| 4,823,049 | 4/1989 | Sanders et al. | 313/623 |
| 4,853,597 | 8/1989 | Heindl et al. | 313/638 |
| 4,920,459 | 4/1990 | Rothwell, Jr. et al. | 362/61 |

*Primary Examiner*—Eugene R. Laroche
*Assistant Examiner*—Michael B. Shingleton
*Attorney, Agent, or Firm*—Sughrue, Mion, Zinn, Macpeak & Seas

[57] ABSTRACT

A discharge lamp system, particularly for vehicular headlamp applications, broadly comprises a discharge lamp assembly and a lighting circuit assembly. The discharge lamp assembly comprises a discharge lamp unit, and a lamp carrier subassembly mechanically supporting the discharge lamp unit and electrically connected thereto. The lighting circuit assembly comprises an electric lighting circuit mounted within a housing or housings for causing the discharge lamp unit to glow by an electric discharge. The discharge lamp assembly and the lighting circuit assembly are directly interconnected both mechanically and electrically, in order to dispense with cables or cords that have been conventionally used for their electrical interconnection.

21 Claims, 17 Drawing Sheets

DISCHARGE LAMP SYSTEM

BACKGROUND OF THE INVENTION

This invention relates generally to electric lamps and particularly to discharge lamps for use on motor vehicles, among other applications. More particularly, the invention pertains to a discharge lamp system featuring cableless connection between a discharge lamp assembly and a lighting circuit assembly.

Discharge lamps, notably including metallic halide lamps, are finding use as light sources of vehicular headlamps. There has, however, been a problem left unsolved in the use of discharge lamps for vehicular headlamp applications.

The discharge lamp needs an electric lighting circuit for providing a high voltage required for an electric discharge to take place between the pair of electrodes of the lamp unit. Cables or cords have so far been used for electrically connecting the discharge lamp to the lighting circuit. The present applicant objects to the cable connection, particularly in use of discharge lamps on motor vehicles. One reason for this objection is the possibility of current leakage from the cables, as the motor vehicle has many electrically conducting parts. Another reason is that the cables are prone to produce electric noise. Such sources of noise production should be eliminated as today's vehicles, passenger cars in particular, are furnished with an increasing number of electric or electronic appliances.

For all these reasons there have been strong demands from the automobile industry for the advent of cableless discharge lamps.

SUMMARY OF THE INVENTION

The present invention aims at the elimination of cables or cords heretofore used for electrically connecting a discharge lamp assembly and a lighting circuit assembly.

Briefly, the invention may be summarized as a discharge lamp system broadly comprising a discharge lamp assembly and a lighting circuit assembly. The discharge lamp assembly resolves itself into a discharge lamp unit, and a lamp carrier subassembly mechanically supporting the discharge lamp unit and electrically coupled thereto via the supporting means. The lighting circuit assembly includes electric lighting circuit means mounted within a housing for causing the discharge lamp unit to glow by an electric discharge. The discharge lamp assembly and the lighting circuit assembly are directly interconnected, both mechanically and electrically, in order to dispense with cables or cords conventionally used therebetween.

More specifically, the lamp carrier subassembly of the discharge lamp assembly is mechanically coupled directly to the housing of the lighting circuit assembly. The lighting circuit means are electrically connected to the discharge lamp unit via the lamp carrier subassembly. Thus the desired cableless connection between the discharge lamp assembly and lighting circuit assembly is accomplished, with the consequent elimination of the noted inconveniences encountered heretofore.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

GENERAL

Figure 1:
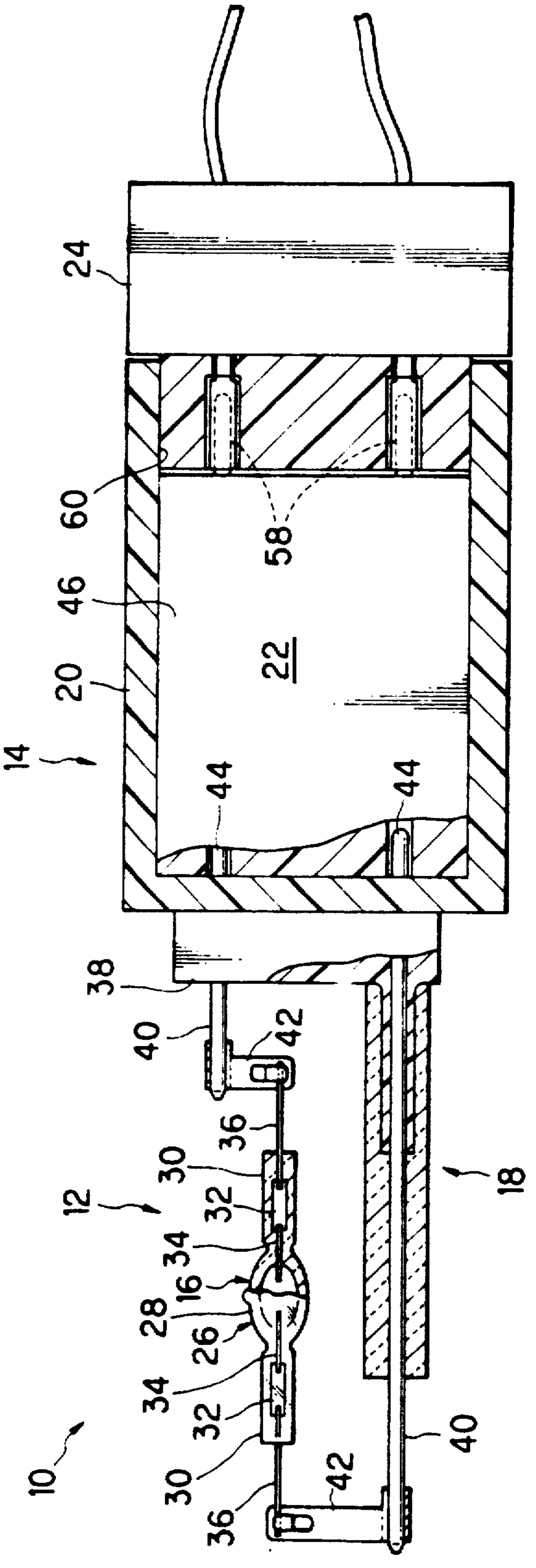
FIG. 1 is a side elevation, partly shown in section for clarity, of a discharge lamp system for vehicular headlamp application constructed in accordance with the novel concepts of this invention.
Figure 2:
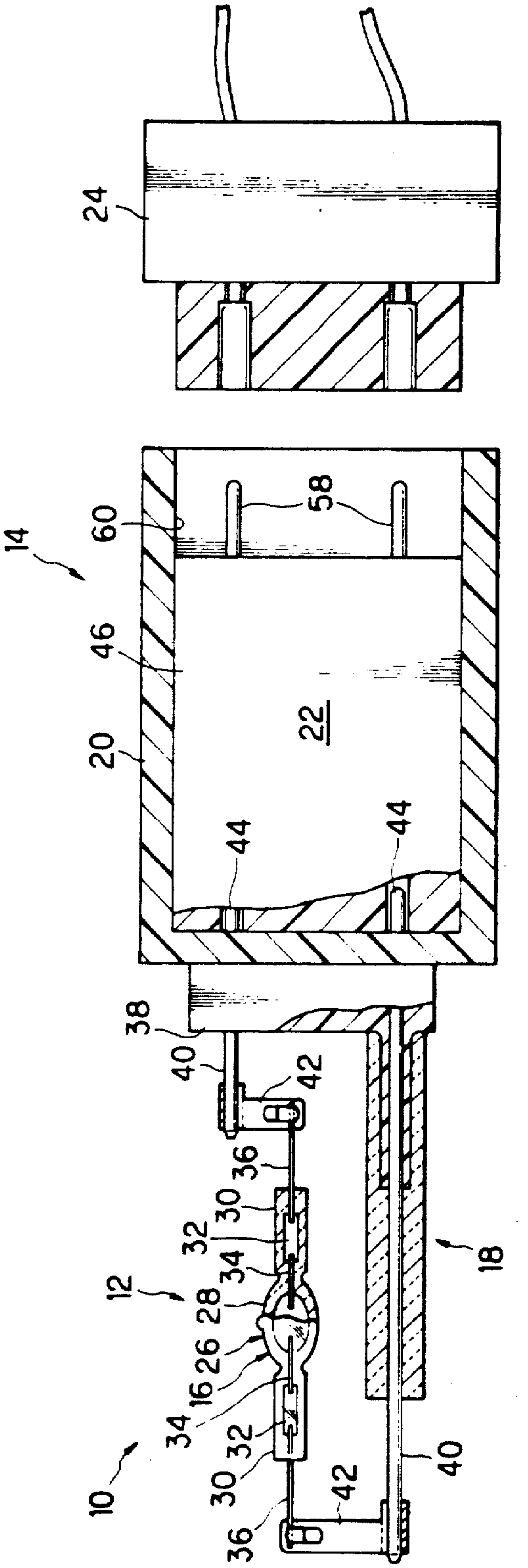
FIG. 2 is a view similar to FIG. 1 except that the supply connector is shown disconnected from the rest of the lamp system.

Reference is first directed to FIGS. 1 and 2 for a consideration of the general construction of the discharge lamp system illustrated therein by way of a first preferred embodiment of this invention. Generally designated 10, the discharge lamp system broadly comprises a discharge lamp assembly 12 and a lighting circuit assembly 14. The discharge lamp assembly 12 comprises a discharge lamp unit 16 and a lamp carrier subassembly 18. The lamp carrier subassembly 18 functions to mechanically support the discharge lamp unit 16 and also to electrically connect the same to the lighting circuit assembly 14.

The lighting circuit assembly 14 comprises a housing 20 of tubular shape and electric lighting circuit means 22 mounted within the housing 20. The lighting circuit means 22 are shown block diagrammatically in FIG. 3, to which reference will be had presently in more detail. The present invention makes it possible to connect the discharge lamp assembly 12 to the lighting circuit means 22 without use of cables or cords.

FIGS. 1 and 2 also show a supply connector 24 for use in connecting the discharge lamp system to a battery, not shown, that is customarily mounted on the motor vehicle. The supply connector 24 is shown coupled to the lighting circuit assembly 14 in FIG. 1 and shown uncoupled therefrom in FIG. 2.

The following is a more detailed discussion of the above listed discharge lamp unit 16, lamp carrier subassembly 18, lighting circuit housing 20, and lighting circuit means 22, in that order and under separate headings. Such discussion will be best understood by referring mostly to FIGS. 1 and 2 and, where the lighting circuit means 22 are concerned, to FIG. 3.

DISCHARGE LAMP UNIT

The discharge lamp unit 16, one of the two primary components of the discharge lamp assembly 12, can be of any known or suitable design. In this particular embodiment the discharge lamp unit 16 is shown to have a bulb or envelope 26 of vitreous material comprising a hollow body 28 in the shape of a prolate sphere with a pair of pinch seals 30 extending in opposite directions therefrom. The pinch seals 30 have a pair of metal foils 32 separately embedded therein. These metal foils are electrically connected one to each of a pair of rod-shaped electrodes 34 which partly extend into the hollow body 28 of the envelope 26. The discharge lamp unit 16 is to glow by an electric discharge between the opposed ends of the electrodes 34. The metal foils 32 are also connected to a pair of lamp leads 36 partly buried one in each pinch seal 30 and extending in opposite directions therefrom.

LAMP CARRIER SUBASSEMBLY

The lamp carrier subassembly 18, the other primary component of the discharge lamp assembly 12, has a carrier base 38 of cylindrical shape and electrically insulating material. Extending through the carrier base 38 in parallel spaced relation to each other are a pair of lead support wires 40 which have portions of different lengths projecting from the carrier base toward the discharge lamp unit 16. The distal ends of the lead support wires 40 are coupled to the pair of lamp leads 36 via sheet metal bridges 42. Thus the lamp carrier subassembly 18 serves the dual purpose of mechanically supporting the discharge lamp unit 16 and electrically connecting the same to the lighting circuit means 22 in a manner to be detailed subsequently.

LIGHTING CIRCUIT HOUSING

The housing 20 of the lighting circuit assembly 14 is shown to be of tubular shape, closed at one end and open at the other. The closed end of the housing 20 is integrally joined to the carrier base 38 of the lamp carrier subassembly 18 in axial alignment therewith. The open end of the housing 20 is intended for mating engagement with the supply connector 24.

The pair of lead support wires 40 of the lamp carrier subassembly 18 have end portions 44 extending into the housing 20 of the lighting circuit assembly 14 through its closed end. These end portions 44 of the lead support wires 40 serve as the input terminals of the discharge lamp assembly 12 which are connected to the lighting circuit means 22.

LIGHTING CIRCUIT MEANS

All the components of the lighting circuit for the discharge lamp unit 16 are enveloped in an enclosure 46 of cylindrical shape to make up the lighting circuit means 22 in this particular embodiment. The enclosure 46 in turn is snugly mounted within the tubular housing 20.

Figure 3:
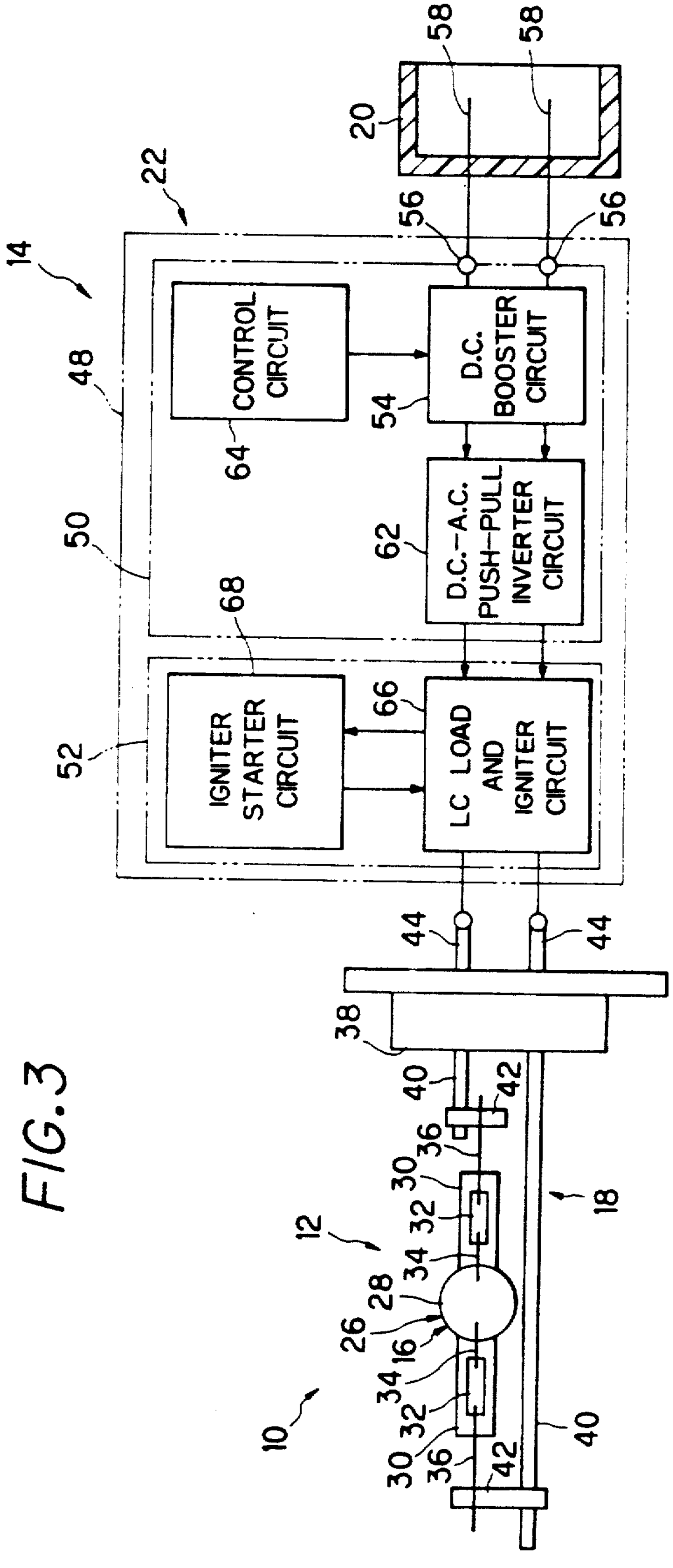
FIG. 3 is a block diagram of the lighting circuit of the lamp system, the lighting circuit being shown together with a schematic representation of the rest of the lamp system.

FIG. 3 illustrates, purely by way of example, the electrical configuration of the lighting circuit 48 suitable for use with the discharge lamp unit 16. Broadly, the exemplified lighting circuit 48 is a combination of a ballast 50 and an igniter 52.

The ballast 50 includes a d.c. booster circuit 54 having a pair of inputs 56 connected to the pair of input terminals 58 of the complete lighting circuit 48. As will be better understood by referring back to FIGS. 1 and 2, the input terminals 58 are disposed in a space 60 left by the lighting circuit means 22 within the lighting circuit housing 20 in the adjacency of its open end. The input terminals 58 are to be electrically connected to the supply connector 24 when the latter is matingly engaged with the lighting circuit assembly 14 as shown in FIG. 1.

Also included in the ballast 50 are a d.c.-a.c. push-pull inverter circuit 62 and a control circuit 64. Connected to the output of the d.c. booster circuit 54, the inverter circuit 62 functions to translate the direct output voltage of the booster circuit into a sinusoidal voltage. The control circuit 64 is intended to control the output voltage of the booster circuit 54 as required by such parameters as the extinction time of the discharge lamp unit 16.

The igniter 52 comprises an LC load and igniter circuit 66 and an igniter starter circuit 68. The LC load and igniter circuit 66 has its input connected to the d.c.-a.c. push-pull inverter circuit 62, and its output to the pair of input terminals 44 of the discharge lamp assembly 12. The igniter starter circuit 68 comprises means, not shown, for supplying a starting current to the igniter circuit 66 and for detecting the lamp current.

The discharge lamp system 10 of the foregoing construction according to the invention is conventional in operation. The present invention features the fact that the discharge lamp assembly 12 has its input terminals 44 coupled directly to the output terminals of the lighting circuit assembly 14. The direct coupling of the discharge lamp assembly 12 and the lighting circuit assembly 14 thoroughly defeats the inconveniences of high voltage current leakage and electrical noise production from cables or cords that have been conventionally employed in discharge lamp systems of this type.

SECOND EMBODIMENT

Figure 4:
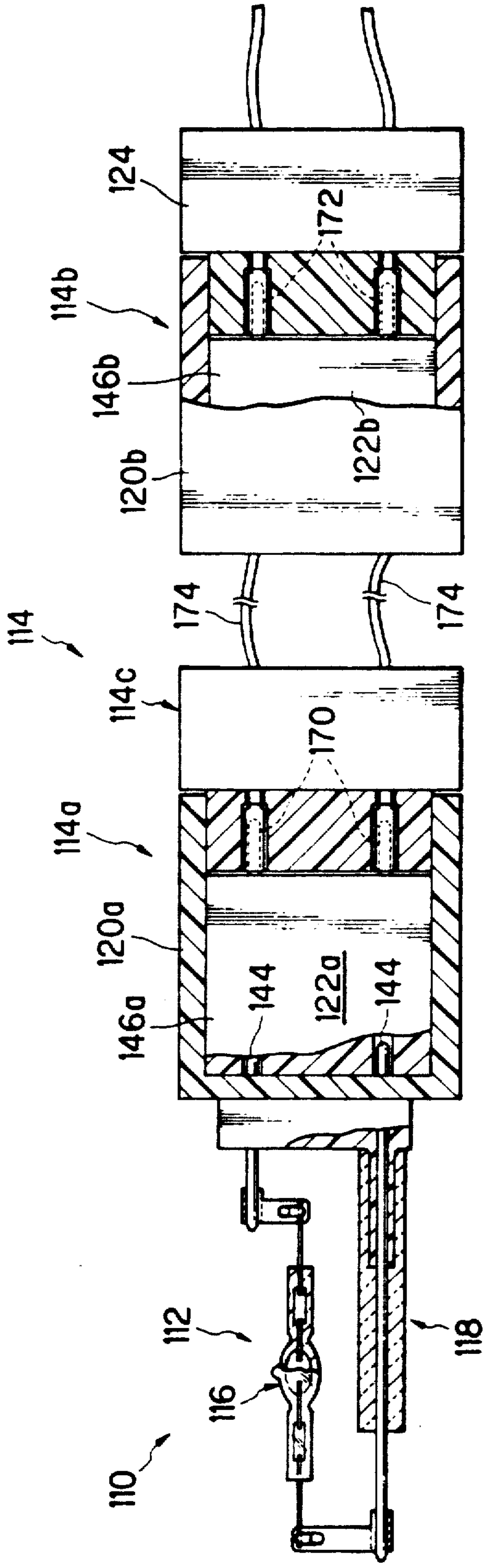
FIG. 4 is a side elevation, partly shown in section for clarity, of another preferred form of discharge lamp system according to the invention.
Figure 5:
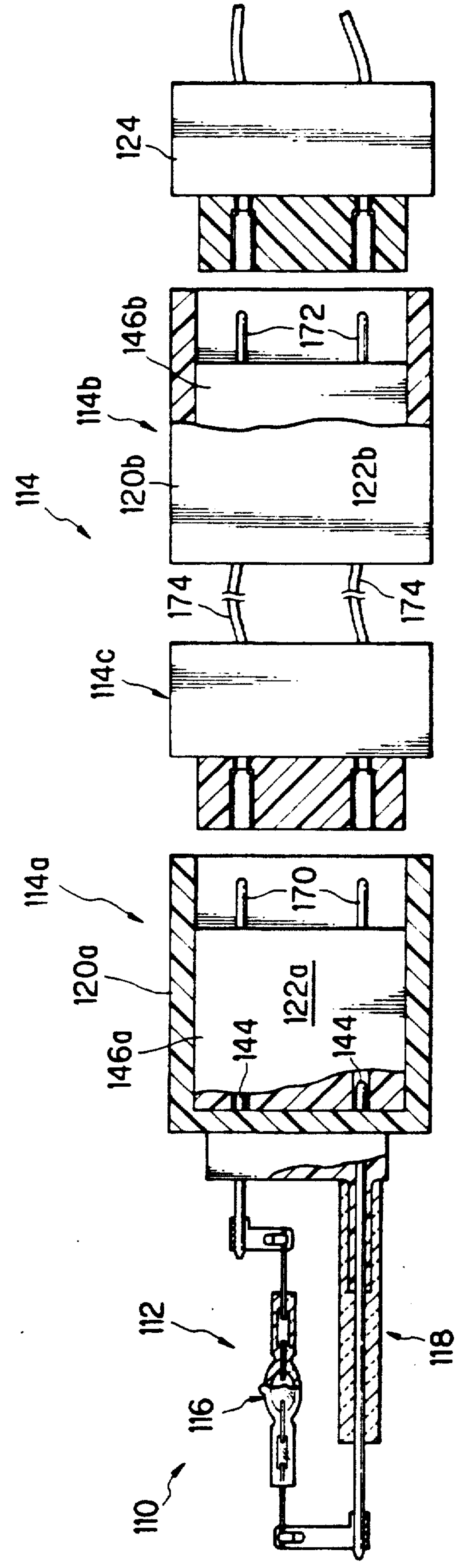
FIG. 5 is a view similar to FIG. 4 except that the subassemblies of the lighting circuit assembly are shown disconnected from one another.

FIGS. 4 and 5 illustrate an alternate discharge lamp system 110 having a discharge lamp assembly 112 and a lighting circuit assembly 114. The discharge lamp assembly 112 is of the same construction as the discharge lamp assembly 12 of the FIGS. 1-3 lamp system 10. Therefore, suffice it to say that the discharge lamp assembly 112 comprises a discharge lamp unit 116 and a lamp carrier subassembly 118. The alternate lamp system 110 features the fact that the lighting circuit assembly 114 is divided into an igniter circuit subassembly 114a, a ballast circuit subassembly 114b, and a connector subassembly 114c between the igniter and ballast circuit subassemblies 114a and 114b.

The igniter circuit subassembly 114a has igniter circuit means 122a snugly mounted within a tubular housing 120a. The igniter circuit means 122a has its own enclosure 146a within which there is enveloped the igniter 52, FIG. 3, of the discharge lamp lighting circuit. The igniter 52 has its output electrically connected to the pair of input terminals 144 of the discharge lamp assembly 112 as in the FIGS. 1-3 embodiment. The igniter circuit means 122a of this second embodiment has a pair of input terminals 170 extending from the enclosure 146a in a direction away from the discharge lamp assembly 112 and disposed within the igniter circuit housing 120a in the adjacency of its open end.

The ballast circuit subassembly 114b has ballast circuit means 122*b* snugly mounted within a tubular housing 120b. The ballast circuit means 122b has its own enclosure 146b which envelopes the ballast 50, FIG. 3, of the discharge lamp lighting circuit. The ballast 50 has a pair of input terminals 172 extending from the enclosure 1476b in a direction away from the discharge lamp assembly 112 for connection to a supply connector 124 which is cabled to the unshown battery.

The connector subassembly 114c is mechanically coupled directly to the igniter circuit subassembly 114a and also electrically coupled to the pair of input terminals 170 of the igniter circuit means 122a of the igniter circuit subassembly 114a. Also, the connector subassembly 114c is electrically connected to the output of the ballast circuit means 122b of the ballast circuit subassembly 114b via cables or cords 174. The igniter circuit subassembly 114a and the ballast circuit subassembly 114b are therefore electrically interconnected via the connector subassembly 114c and the cables 174.

Thus, in this alternate discharge lamp system 110, the discharge lamp assembly 112 is coupled directly to the igniter circuit subassembly 114a which includes the igniter section of the lighting circuit. Although the igniter circuit subassembly 114a and the ballast circuit subassembly 114b are interconnected via the cables 174, no serious inconveniences are to arise from these cables.

THIRD EMBODIMENT

Figure 6:
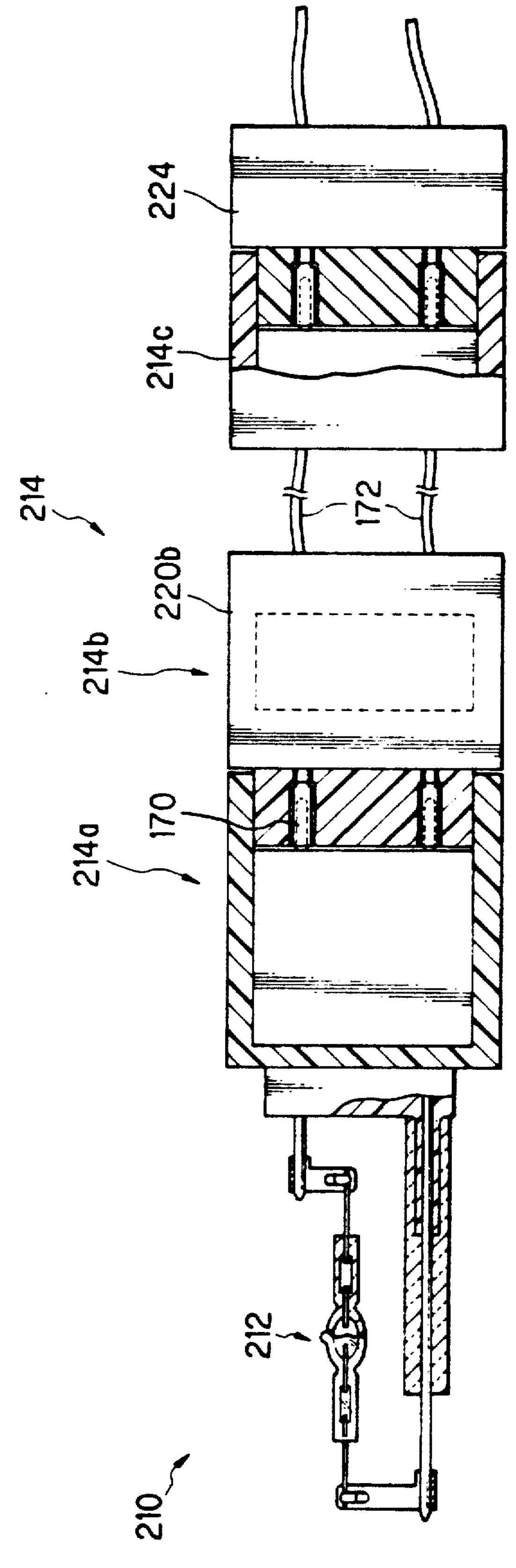
FIG. 6 is a side elevation, partly shown in section for clarity, of still another preferred form of discharge lamp system according to the invention.
Figure 7:
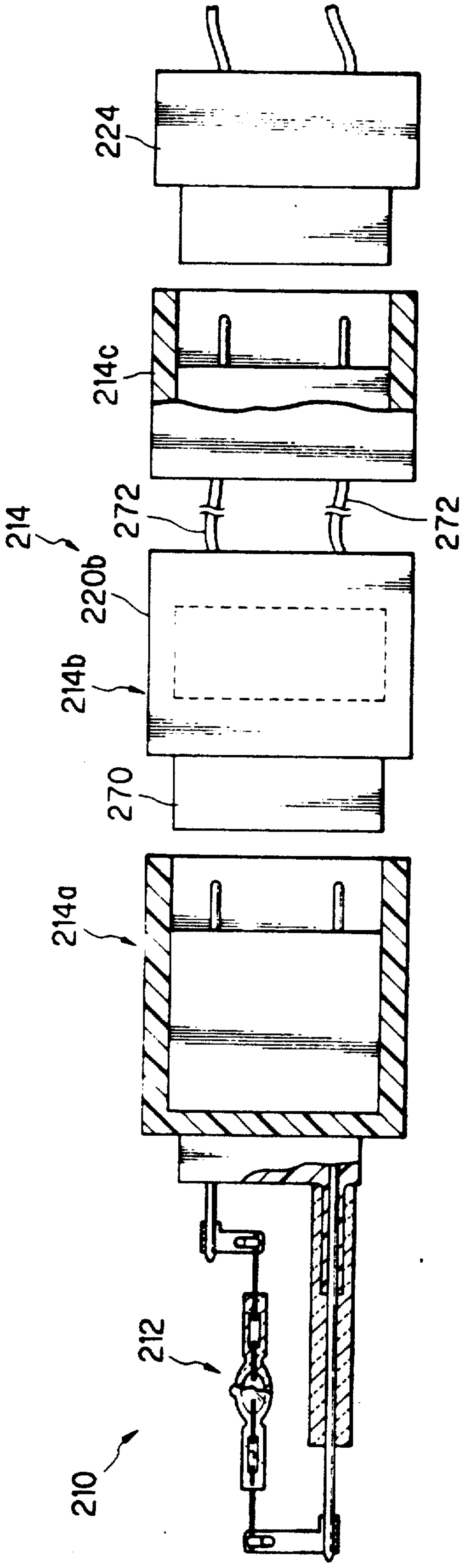
FIG. 7 is a view similar to FIG. 6 except that the subassemblies of the lighting circuit assembly are shown disconnected from one another.

FIGS. 6 and 7 show another alternate discharge lamp system 210 which is a slight modification of the FIGS. 4 and 5 lamp system 110. The modified lamp system 210 is a combination of a discharge lamp assembly 212 and a lighting circuit assembly 214. While the discharge lamp assembly 212 is identical in construction with its counterparts of the foregoing embodiments, the lighting circuit assembly 214 represents a modification of the lighting circuit assembly 114 of FIGS. 4 and 5.

The modified lighting circuit assembly 214 comprises an igniter circuit subassembly 214a, a ballast circuit subassembly 214b coupled directly to the igniter circuit subassembly, and a connector subassembly 214c connecting the ballast circuit subassembly to a supply connector 224. The igniter circuit subassembly 214a is of the same construction with the FIGS. 4 and 5 igniter circuit subassembly 114a. However, the ballast circuit subassembly 214b differs from the FIGS. 4 and 5 ballast circuit subassembly 114b in having a connector 270 formed in one piece with its housing 220b for direct mechanical and electrical connection with the igniter circuit subassembly 214a. The connector 270 is for mating engagement with the open end of the igniter circuit subassembly 214a.

Also, in this discharge lamp system 210, the ballast circuit assembly 214b has its input coupled to the connector subassembly 214c via a pair of cables or cords 272 and thence to the supply connector 224. This construction contrasts with that of the FIGS. 4 and 5 lamp system 110 in which the ballast circuit assembly 114b has its input coupled directly to the supply connector 124.

FOURTH EMBODIMENT

Figure 8:
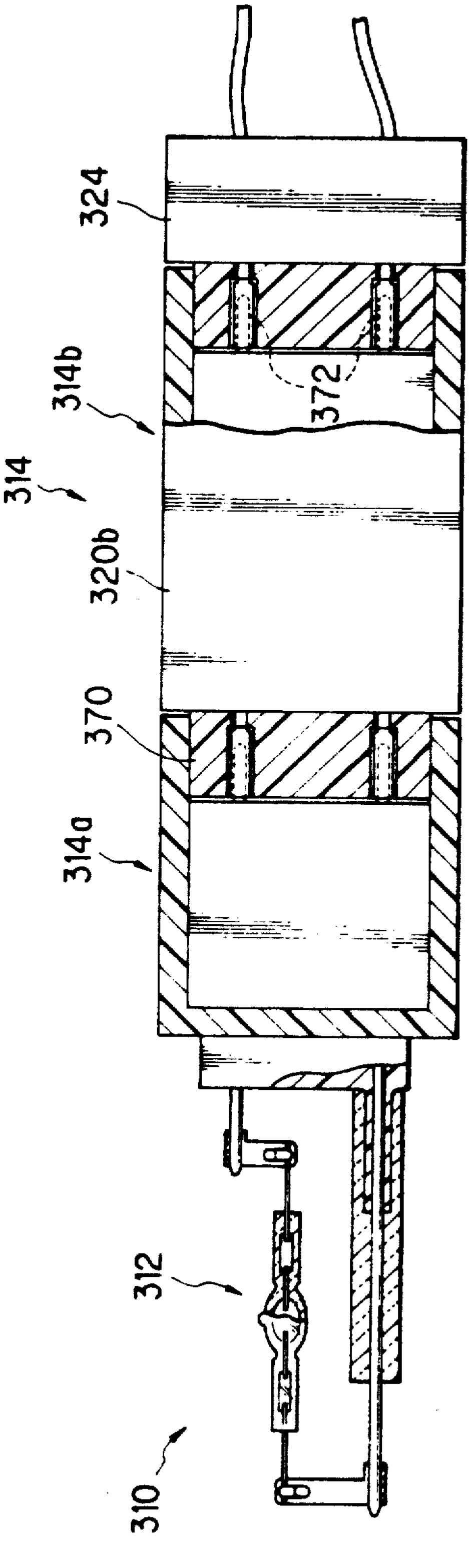
FIG. 8 is a side elevation, partly shown in section for clarity, of yet another preferred form of discharge lamp system according to the invention.
Figure 9:
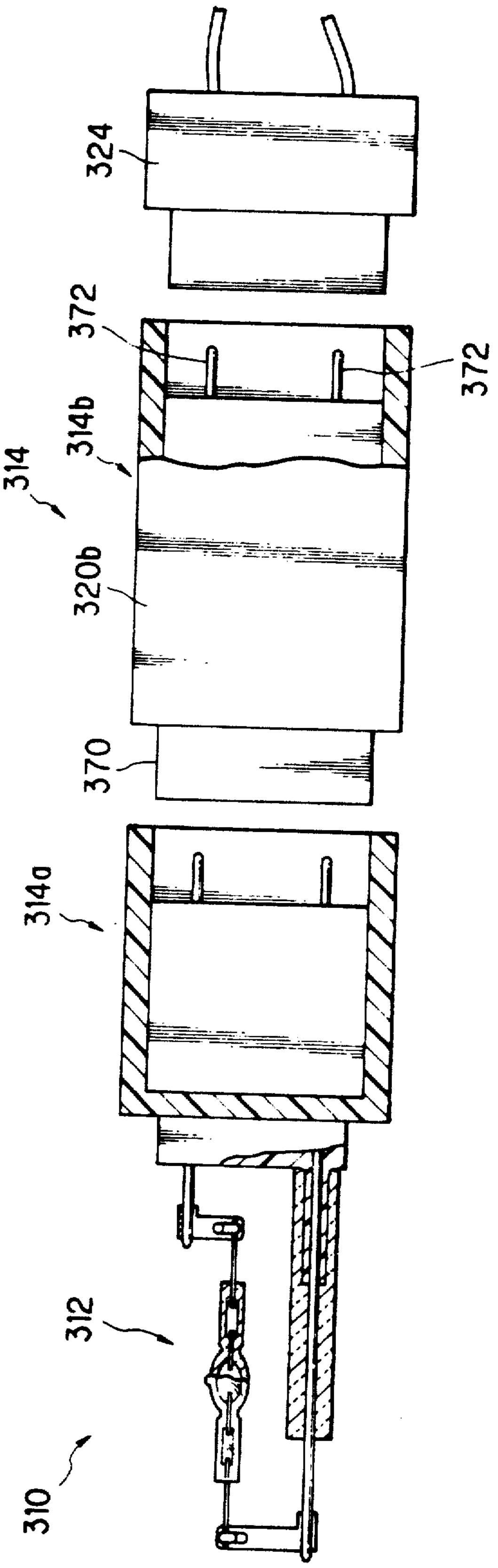
FIG. 9 is a view similar to FIG. 8 except that the subassemblies of the lighting circuit assembly are shown disconnected from one another.

In FIGS. 8 and 9 is shown still another alternate discharge lamp system 310 comprising a discharge lamp assembly 312 and a lighting circuit assembly 314. The discharge lamp assembly 312 is of the same construction with its counterparts of the foregoing embodiments. The lighting circuit assembly 314 is a slight modification of the FIGS. 4 and 5 lighting circuit assembly 214.

The modified lighting circuit assembly 314 comprises an igniter circuit subassembly 314a including the igniter 52 of the lighting circuit 48, FIG. 3, and a ballast circuit subassembly 314b including the ballast 50 of the lighting circuit 48. The igniter circuit subassembly 314a is of the same construction with the FIGS. 4 and 5 igniter circuit subassembly 114a and with the FIGS. 6 and 7 igniter circuit subassembly 214a. The ballast circuit subassembly 314b characterizes the modified lighting circuit assembly 314 in providing for direct mechanical and electrical connection between the igniter circuit subassembly 314a and a supply connector 324.

More specifically, the ballast circuit subassembly 314b has a connector 370 formed in one piece with its housing 320b for direct mechanical and electrical connection with the igniter circuit subassembly 314a. The connector 370 is for mating engagement with the open end of the igniter circuit subassembly 314a. Also, the ballast circuit subassembly 314b has its end portion away from the discharge lamp assembly 312 shaped for direct mating engagement with the supply connector 324. The ballast 50, FIG. 3, of the ballast circuit subassembly 314b has a pair of input terminals 372 for direct electrical connection with the supply connector 324.

FIFTH EMBODIMENT

Figure 10:
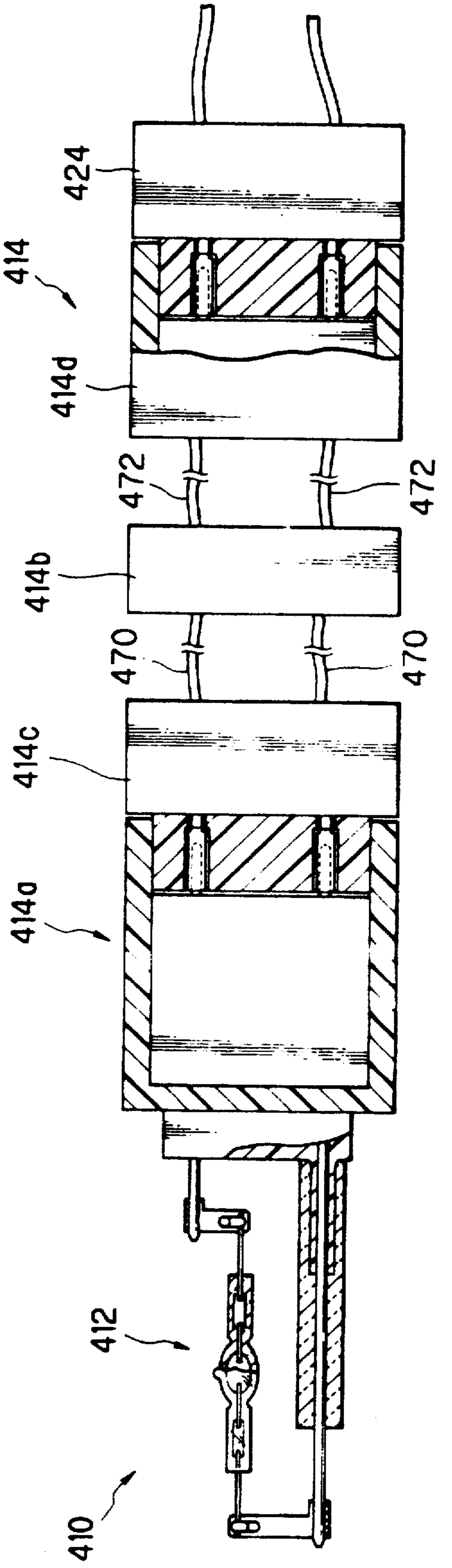
FIG. 10 is a side elevation, partly shown in section for clarity, of a further preferred form of discharge lamp system according to the invention.
Figure 11:
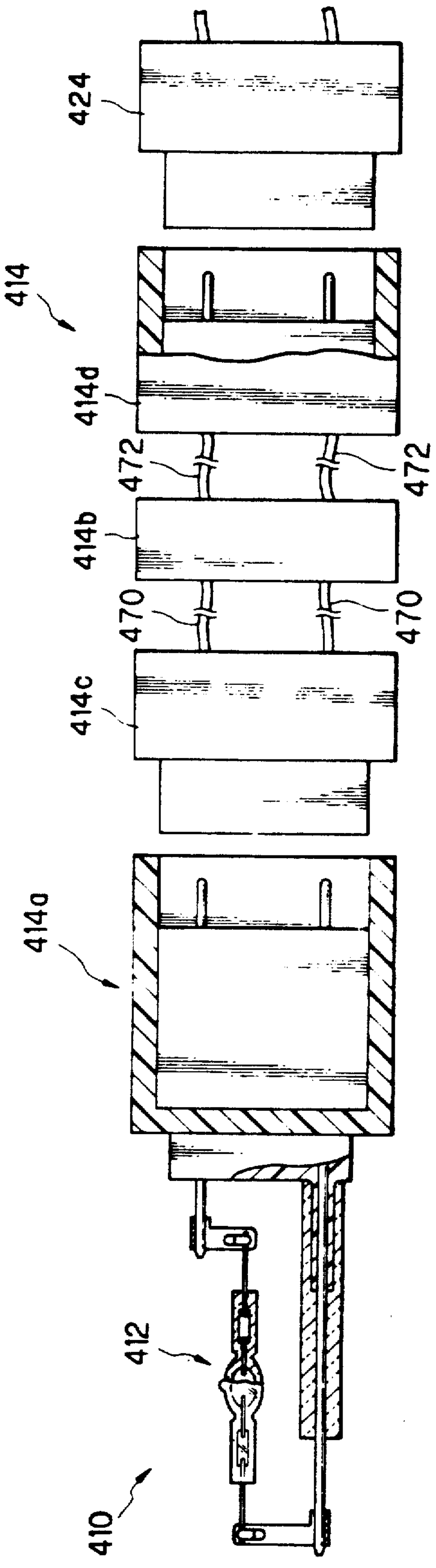
FIG. 11 is a view similar to FIG. 10 except that the subassemblies of the lighting circuit assembly are shown disconnected from one another.

The discharge lamp system 410 of FIGS. 10 and 11 represents yet another modification of the FIGS. 4 and 5 lamp system 110. The modified lamp system 410 comprises a discharge lamp assembly 412 of the same construction as its counterparts of all the foregoing embodiments, and a lighting circuit assembly 414 characterizing the lamp system 410.

The lighting circuit assembly 414 comprises an igniter circuit subassembly 414a, a ballast circuit subassembly 414b, a first connector subassembly 414c between the igniter and ballast circuit subassemblies 414a and 414b, and a second connector subassembly 414d between the ballast circuit subassembly 414b and a supply connector 424. The igniter circuit subassembly 414a is of the same construction with the FIGS. 4 and 5 igniter circuit subassembly 114a and is capable of direct mechanical and electrical connection with the first connector subassembly 414*c*. The ballast circuit subassembly 414*b*, including the ballast 50 of the lighting circuit 48, FIG. 3, is electrically connected to the first connector subassembly 414*c* via a pair of cables or cords 470, and to the second connector subassembly 414*d* via another pair of cables or cords 472. The second connector subassembly 414*d* is for direct mechanical and electrical connection with the supply connector 424.

SIXTH EMBODIMENT

Figure 12:
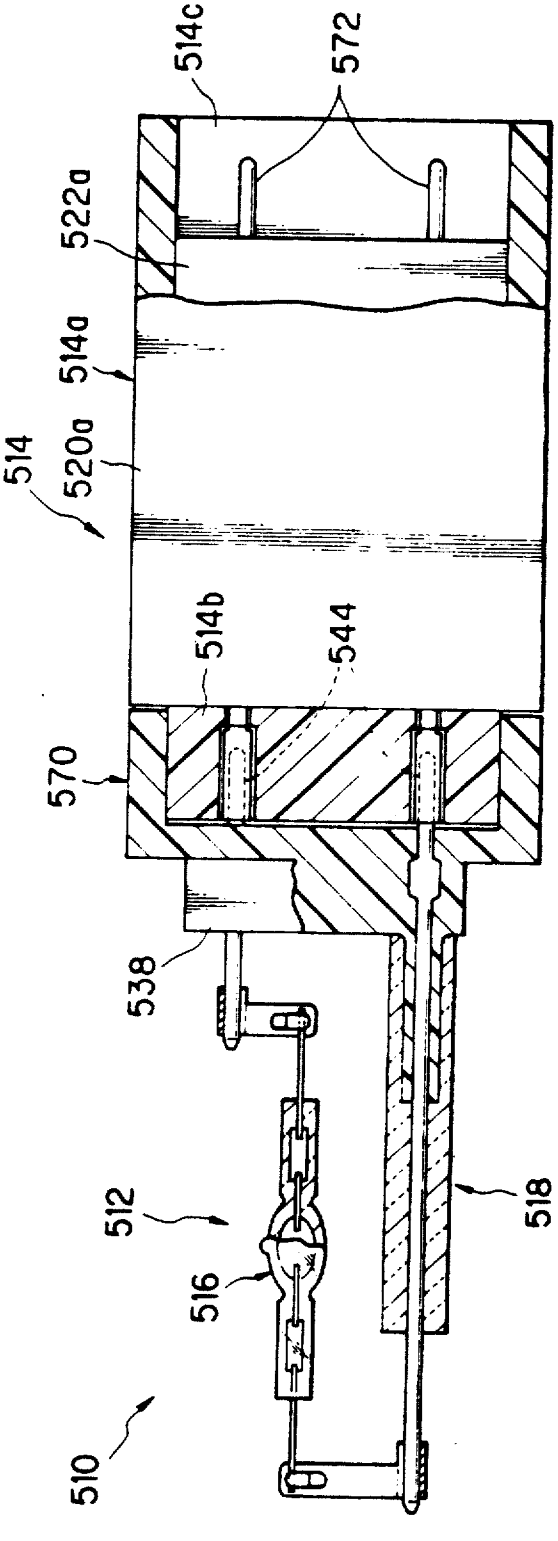
FIG. 12 is a side elevation, partly shown in section for clarity, of a still further preferred form of discharge lamp system according to the invention.
Figure 13:
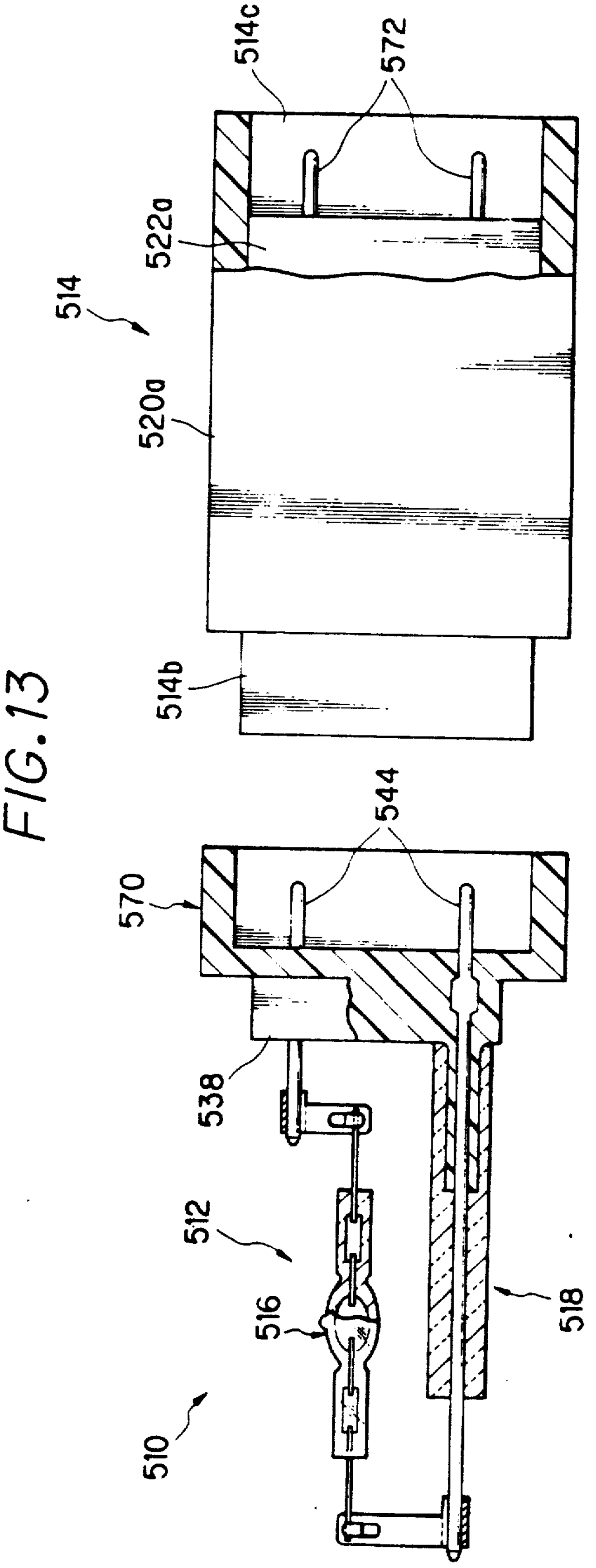
FIG. 13 is a view similar to FIG. 12 except that the discharge lamp assembly and the lighting circuit assembly are shown disconnected from each other.

The discharge lamp system 510 of FIGS. 12 and 13 comprises a discharge lamp assembly 512 and a lighting circuit assembly 514. The discharge lamp assembly 512 comprises a discharge lamp unit 516, a lamp carrier subassembly 518 and a connector 570. The discharge lamp unit 516 is of the same construction as the discharge lamp unit 16 of the FIGS. 1-3 lamp system 10. The lamp carrier subassembly 518 is per se of the same construction as the lamp carrier subassembly 18 of the FIGS. 1-3 lamp system 10. However, unlike the lamp carrier subassembly 18, the carrier base 538 of the lamp carrier subassembly 518 is formed in one piece with the connector 570. This connector 570 includes a pair of input terminals 544 which are electrically and mechanically connected to the discharge lamp unit 516 of the discharge lamp assembly 512.

The lighting circuit assembly 514 comprises an igniter circuit subassembly 514*a* formed in one piece with a first connector 514*b* at one end and with a second connector 514*c* at the other. The igniter circuit subassembly 514*a* has igniter circuit means 522*a* snugly mounted within a tubular housing 520*a*. The igniter circuit means 522*a* include the igniter 52, FIG. 3, of the discharge lamp lighting circuit. The igniter circuit housing 520*a* is formed in one piece with the first connector 514*b* for mating engagement with the connector 570 of the discharge lamp assembly 512. The pair of input terminals 572 of the igniter circuit means 522*a* are disposed within the igniter circuit housing 520*a* in the adjacency of its open end directed away from the discharge lamp assembly 512 to provide the second connector 514*c* of the lighting circuit assembly 514.

The second connector 514*c* of the lighting circuit subassembly 514 is for direct mechanical and electrical connection of the igniter circuit subassembly 514*a* with the connector subassembly 114*c* of the FIGS. 4 and 5 lamp system 110. A reference back to FIGS. 4 and 5 will reveal that the connector subassembly 114*c* is cabled to the ballast circuit subassembly 114*b* which in turn is coupled directly to the supply connector 124.

SEVENTH EMBODIMENT

Figure 14:
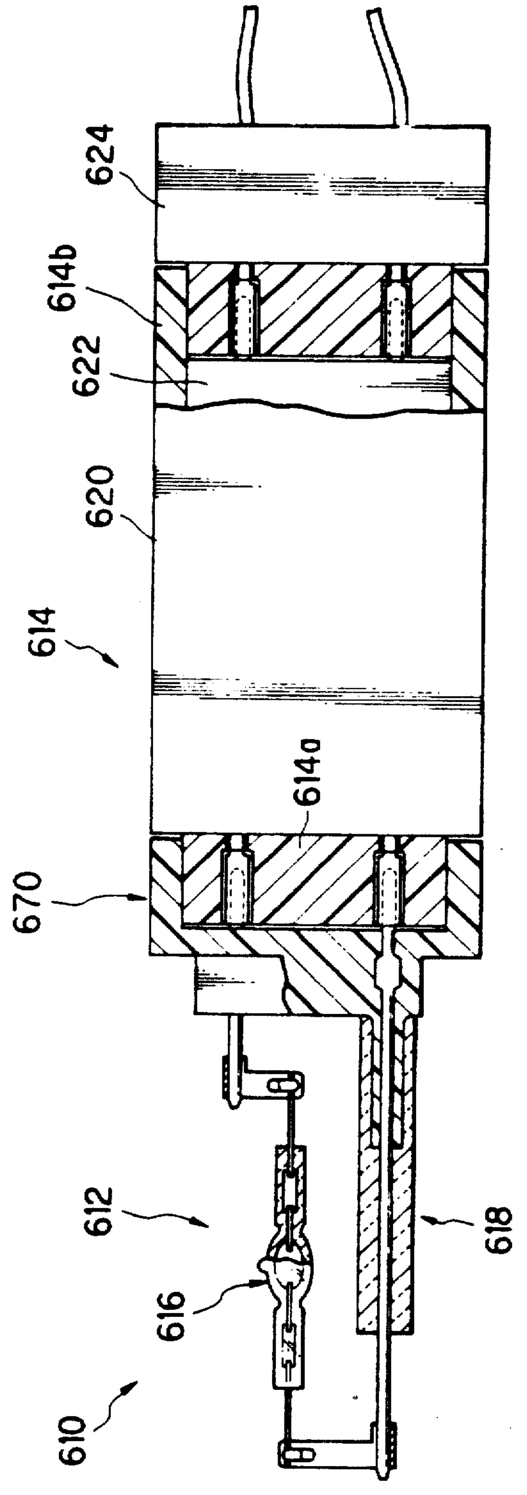
FIG. 14 is a side elevation, partly shown in section for clarity, of a yet further preferred form of discharge lamp system according to the invention.
Figure 15:
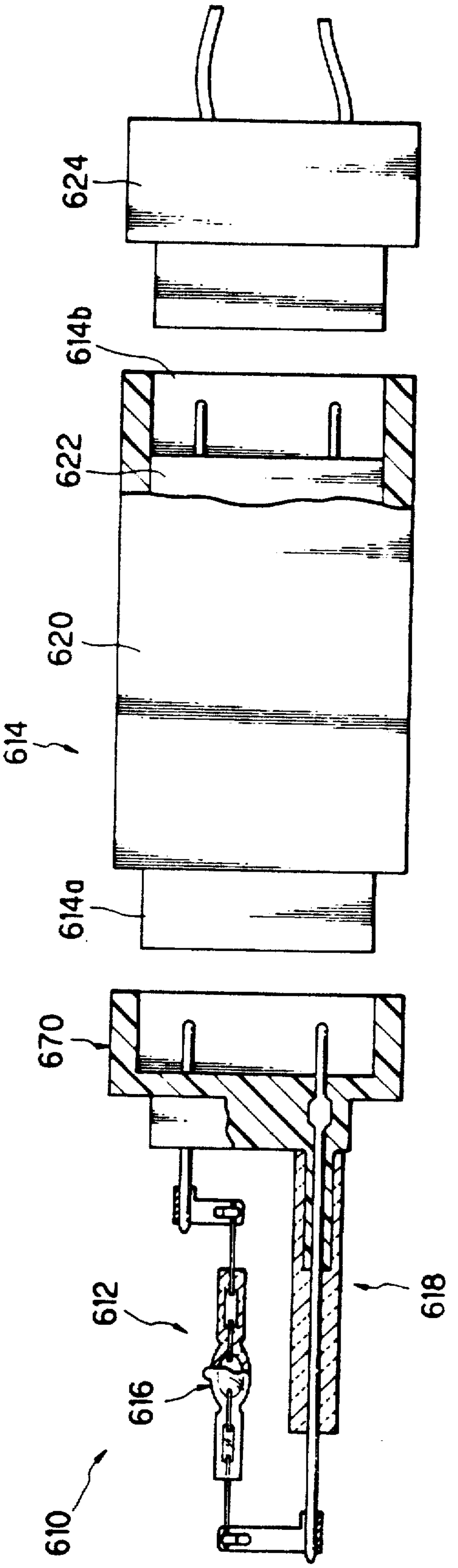
FIG. 15 is a view similar to FIG. 14 except that the subassemblies of the lighting circuit assembly are shown disconnected from each other and from the discharge lamp assembly.

FIGS. 14 and 15 show a slight modification 610 of the FIGS. 12 and 13 lamp system 510. The modified lamp system 610 comprises a discharge lamp assembly 612 and a lighting circuit assembly 614. The discharge lamp assembly 612 is of the same construction as the discharge lamp assembly 512 of the FIGS. 12 and 13 lamp system 510, comprising a discharge lamp unit 616, a lamp carrier subassembly 618, and a connector 670 formed in one piece with the lamp carrier subassembly.

The lighting circuit assembly 614, which characterizes the lamp system 610, has the complete lighting circuit means 622 mounted within a tubular housing 620. Also included in the lighting circuit assembly 614 are first and second connectors 614*a* and 614*b* which are formed at the opposite ends of the lighting circuit housing 620 in one piece therewith. The first connector 614*a* is for direct mechanical and electrical connection of the lighting circuit assembly 614 with the connector 670 of the discharge lamp assembly 612. The second connector 614*b* is for direct mechanical and electrical connection of the lighting circuit assembly 614 with a supply connector 624.

EIGHTH EMBODIMENT

Figure 16:
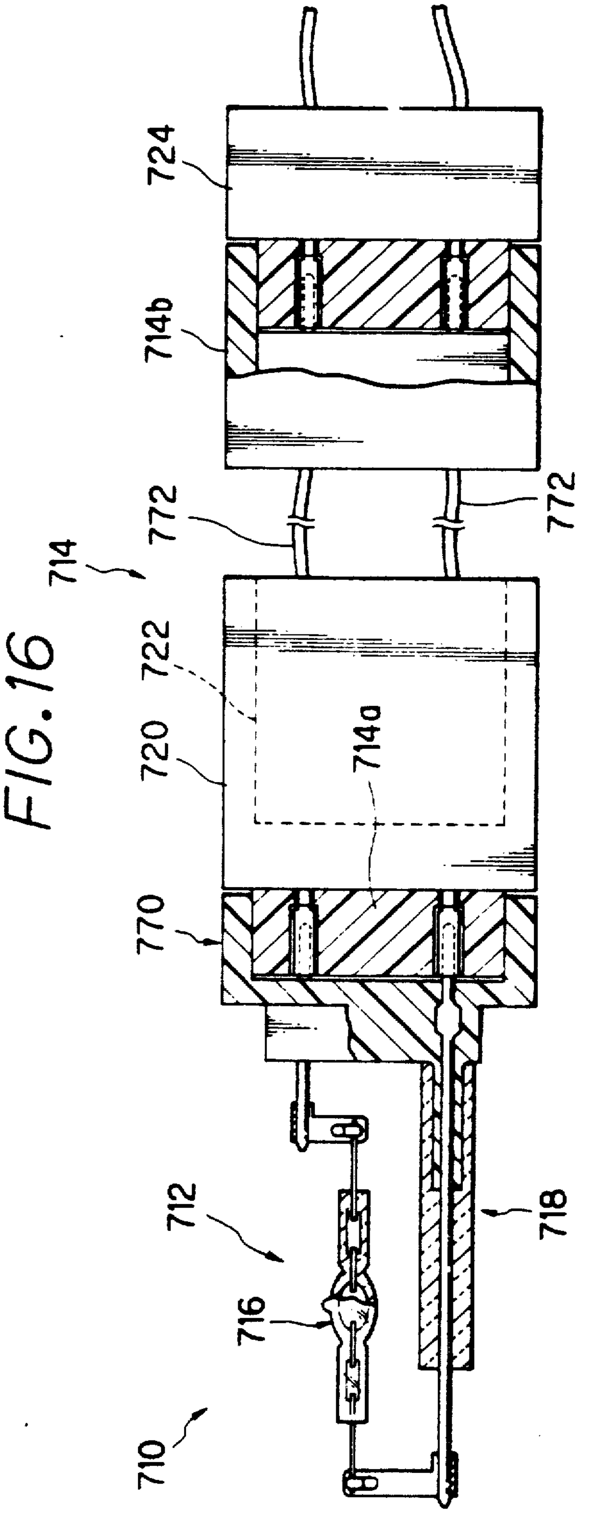
FIG. 16 is a side elevation, partly shown in section for clarity, of a further yet preferred form of discharge lamp system according to the invention.
Figure 17:
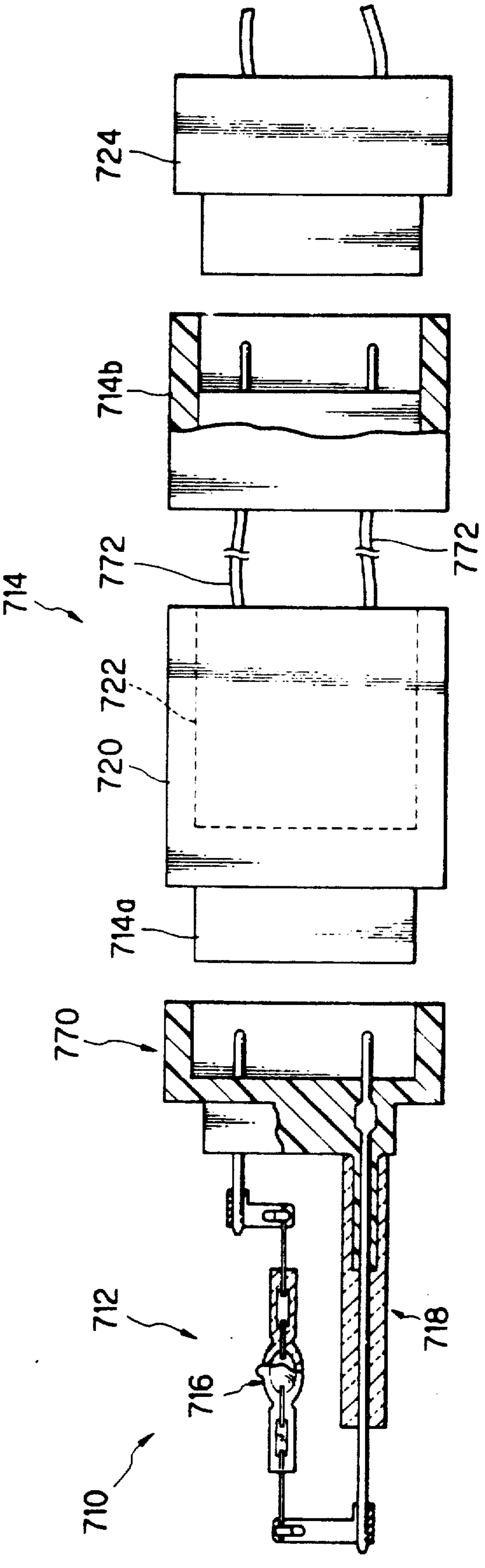
FIG. 17 is a view similar to FIG. 16 except that the subassemblies of the lighting circuit assembly are shown disconnected from one another and from the discharge lamp assembly.

In FIGS. 16 and 17 is shown another slight modification 710 of the FIGS. 12 and 13 lamp system 510. The modified lamp system 710 comprises a discharge lamp assembly 712 and a lighting circuit assembly 714. The discharge lamp assembly 712 is of the same construction as the discharge lamp assembly 512 of the FIGS. 12 and 13 lamp system 510, comprising a discharge lamp unit 716, a lamp carrier subassembly 718, and a connector 770 formed in one piece with the lamp carrier subassembly.

Like the lighting circuit assembly 614 of the FIGS. 14 and 15 lamp system 610, the lighting circuit assembly 714 has the complete lighting circuit means 722 mounted within a tubular housing 720. However, the lighting circuit housing 720 has only one connector 714*a* formed at one end for direct mechanical and electrical connection with the connector 770 of the discharge lamp assembly 712. The other end of the lighting circuit housing 720 is connected to a connector subassembly 714*b* via a pair of cables 772. The connector subassembly 714*b* is directly coupled to a supply connector 724.

Thus the improved discharge lamp system of the present invention has been disclosed in several preferred forms which all accomplishes the objective of direct, cableless connection between discharge lamp assembly and lighting circuit assembly. However, such illustrated embodiments are not to be taken in a limitative sense, as the invention permits a variety of additional forms without departure from the scope of the subjoined claims.

What is claimed is:

1. A discharge lamp system comprising:

(A) a discharge lamp assembly comprising:

(a) a discharge lamp unit comprising a discharge bulb having a pair of lamp leads extending from opposite ends thereof; and (b) a lamp carrier subassembly mechanically and electrically coupled to the discharge lamp unit, said lamp carrier subassembly comprising a carrier base having a pair of linear lead support wires extending through said carrier base in spaced relation to each other, said lamp leads of said discharge bulb being connected to said lead support wires; and (B) a lighting circuit assembly comprising:

(a) tubular housing means having an open end and a closed end, said carrier base being integrally joined with said closed end, distal ends of said lead support wires extending from said carrier base through said closed end of said housing means and terminating within the interior of said housing means; and (b) electric lighting circuit means mounted within the housing means for causing the discharge lamp unit to glow by an electric discharge, said electrical lighting circuit means having output terminals connected to said distal ends of said lead support wires;

(C) wherein the discharge lamp assembly and the lighting circuit assembly are directly interconnected, both mechanically and electrically, in order to dispense with cable or cords therebetween.

2. The discharge lamp system of claim 1 further comprising a supply connector capable of direct mechanical and electrical connection to, and disconnection from, the lighting circuit assembly.

3. The discharge lamp system of claim 1 wherein the lighting circuit means of the lighting circuit assembly comprises igniter means and ballast means, and wherein the lighting circuit assembly comprises:

(A) an igniter circuit subassembly including the igniter means of the lighting circuit means and directly coupled, both mechanically and electrically, to the discharge lamp assembly;

(B) a connector subassembly capable of direct mechanical and electrical connection to, and disconnection from, the igniter circuit subassembly; and (C) a ballast circuit subassembly including the ballast means of the lighting circuit means and electrically connected to the connector subassembly via a pair of cables or cords.

4. The discharge lamp system of claim 3 further comprising a supply connector capable of direct mechanical and electrical connection to, and disconnection from, the ballast circuit subassembly of the lighting circuit assembly.

5. The discharge lamp system of claim 3 wherein the housing means of the lighting circuit assembly comprises two separate housings accommodating the igniter means of the igniter circuit subassembly and the ballast means of the ballast circuit subassembly, respectively, and wherein the carrier base of the lamp carrier subassembly of the discharge lamp assembly is integrally joined with the housing of the igniter circuit subassembly.

6. The discharge lamp system of claim 1 wherein the lighting circuit means of the lighting circuit assembly comprises igniter means and ballast means, and wherein the lighting circuit assembly comprises:

(A) an igniter circuit subassembly including the igniter means of the lighting circuit means and directly coupled, both mechanically and electrically, to the discharge lamp assembly;

(B) a ballast circuit subassembly including the ballast means of the lighting circuit means and being capable of direct mechanical and electrical connection to, and disconnection from, the igniter circuit subassembly; and (C) a connector subassembly electrically connected to the ballast circuit subassembly via a pair of cables or cords.

7. The discharge lamp system of claim 6 further comprising a supply connector capable of direct mechanical and electrical connection to, and disconnection from, the connector subassembly of the lighting circuit assembly.

8. The discharge lamp system of claim 6 wherein the housing means of the lighting circuit assembly comprises two separate housings accommodating the igniter means of the igniter circuit subassembly and the ballast means of the ballast circuit subassembly, respectively, and wherein the carrier base of the lamp carrier subassembly of the discharge lamp assembly is integrally joined with the housing of the igniter circuit subassembly.

9. The discharge lamp system of claim 1 wherein the lighting circuit means of the lighting circuit assembly comprises igniter means and ballast means, and wherein the lighting circuit assembly comprises:

(A) an igniter circuit subassembly including the igniter means of the lighting cirucit means and directly coupled, both mechanically and electrically, to the discharge lamp assembly; and (B) a ballast circuit subassembly including the ballast means of the lighting circuit means and being capable of direct mechanical and electrical connection to, and disconnection from, the igniter circuit subassembly.

10. The discharge lamp system of claim 9 further comprising a supply connector capable of direct mechanical and electrical connection to, and disconnection from, the ballast circuit subassembly of the lighting circuit assembly.

11. The discharge lamp system of claim 9 wherein the housing means of the lighting circuit assembly comprises two separate housings accommodating the igniter means of the igniter circuit subassembly and the ballast means of the ballast circuit subassembly, respectively, and wherein the carrier base of the lamp carrier subassembly of the discharge lamp assembly is integrally joined with the housing of the igniter circuit subassembly.

12. The discharge lamp system of claim 1 wherein the lighting circuit means of the lighting circuit assembly comprises igniter means and ballast means, and wherein the lighting circuit assembly comprises:

(A) an igniter circuit subassembly including the igniter means of the lighting circuit means and directly coupled, both mechanically and electrically, to the discharge lamp assembly;

(B) a first connector subassembly capable of direct mechanical and electrical connection to, and disconnection from, the igniter circuit subassembly;

(C) a ballast circuit subassembly including the ballast means of the lighting circuit means and electrically connected to the first connector subassembly via a pair of cables or cords; and (D) a second connector subassembly electrically connected to the ballast circuit subassembly via another pair of cables or cords.

13. The discharge lamp system of claim 12 further comprising a supply connector capable of direct mechanical and electrical connection to, and disconnection from, the second connector subassembly of the lighting circuit assembly.

14. The discharge lamp system of claim 3 wherein the housing means of the lighting circuit assembly comprises two separate housings accommodating the igniter means of the igniter circuit subassembly and the ballast means of the ballast circuit subassembly, respectively, and wherein the carrier base of the lamp carrier subassembly of the discharge lamp assembly is integrally joined with the housing of the igniter circuit subassembly.

15. A discharge lamp system comprising:

(A) a discharge lamp assembly comprising:

(a) a discharge lamp unit comprising a discharge bulb having a pair of lamp leads extending from opposite ends thereof; and (b) a lamp carrier subassembly mechanically and electrically coupled to the discharge lamp unit, said lamp carrier subassembly comprising a carrier base having a pair of linear lead support wires extending through said carrier base in spaced relation to each other, said lamp leads of said discharge bulb being connected to said lead support wires; and (B) a lighting circuit assembly comprising:

(a) tubular housing means having an open end and a closed end, said carrier base being integrally joined with said closed end, distal ends of said lead support wires extending from said carrier base through said closed end of said housing means and terminating within the interior of said housing means; and (b) electric lighting circuit means mounted within the housing means for causing the discharge lamp unit to glow by an electric discharge, said electrical lighting circuit means having output terminals connected to said distal ends of said lead support wires;

(C) wherein the discharge lamp assembly and the lighting circuit assembly are capable of direct mechanical and electrical connection to, and disconnection from, each other in order to dispense with cable or cords therebetween.

16. The discharge lamp system of claim 15 further comprising a supply connector capable of direct mechanical and electrical connection to, and disconnection from, the lighting circuit assembly.

17. The discharge lamp system of claim 15 wherein the lighting circuit means of the lighting circuit assembly comprises igniter means and ballast means, and wherein the lighting circuit assembly comprises:

(A) an igniter circuit subassembly including the igniter means of the lighting circuit means and being capable of direct mechanical and electrical connection to, and disconnection from, the discharge lamp assembly;

(B) a connector subassembly capable of direct mechanical and electrical connection to, and disconnection from, the igniter circuit subassembly; and (C) a ballast circuit subassembly including the ballast means of the lighting circuit means and electrically connected to the connector subassembly via a pair of cables or cords.

18. The discharge lamp system of claim 17 further comprising a supply connector capable of direct mechanical and electrical connection to, and disconnection from, the ballast circuit subassembly of the lighting circuit assembly.

19. The discharge lamp system of claim 15 further comprising a supply connector capable of direct mechanical and electrical connection to, and disconnection from, the lighting circuit assembly.

20. The discharge lamp system of claim 15 wherein the lighting circuit assembly further comprises a connector subassembly electrically connected to the lighting circuit means via a pair of cables or cords.

21. The discharge lamp system of claim 20 further comprising a supply connector capable of direct mechanical and electrical connection to, and disconnection from, the connector subassembly of the lighting circuit assembly.

* * * * *